United States Patent
Potanin

(10) Patent No.: US 6,717,458 B1
(45) Date of Patent: Apr. 6, 2004

(54) METHOD AND APPARATUS FOR A DC-DC CHARGE PUMP VOLTAGE CONVERTER-REGULATOR CIRCUIT

(75) Inventor: Vladislav Y. Potanin, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/007,135

(22) Filed: Dec. 3, 2001

(51) Int. Cl.$^7$ ................................................ G05F 1/10
(52) U.S. Cl. ........................ 327/536; 327/537; 327/306
(58) Field of Search ................................. 327/536, 537, 327/534, 390, 589, 590, 306, 331, 332

(56) References Cited

U.S. PATENT DOCUMENTS

| | | | | |
|---|---|---|---|---|
| 5,812,017 A | * | 9/1998 | Golla et al. ................. | 327/536 |
| 6,107,862 A | * | 8/2000 | Mukainakano et al. ..... | 327/536 |
| 6,259,612 B1 | * | 7/2001 | Itoh ............................ | 363/60 |

OTHER PUBLICATIONS

Makowski, M., "Realizability Conditions and Bounds on Synthesis of Switched–Capacitor DC–DC Voltage Multiplier Circuits;" *IEEE Transactions on Circuits and Systems—I: Fundamental Theory and Applications 44:8* (Aug. 1997), pp. 684–691.

Starzyk, J. et al., "A DC–DC Charge Pump Design Based on Voltage Doublers," *IEEE Transactions on Circuits and Systems—I: Fundamental Theory and Applications 48:3* (Mar. 2001), pp. 350–359.

\* cited by examiner

*Primary Examiner*—Tuan T. Lam
*Assistant Examiner*—Hiep Nguyen
(74) *Attorney, Agent, or Firm*—Merchant & Gould P.C.; Joshua W. Korver

(57) ABSTRACT

An apparatus and method for a DC-DC charge pump voltage converter-regulator circuit includes a control circuit, a multiplier circuit, and a feedback circuit. The feedback circuit includes a load circuit, a comparator circuit, and a voltage reference circuit. The multiplier circuit produces an output signal by multiplying a supply signal according to a multiplication factor. The output signal is communicated to the load circuit. The output signal is measured producing a sense signal. The voltage reference circuit produces a reference voltage. The control circuit regulates the output signal according the result of a comparison between the sense signal and the reference voltage. In one embodiment, the multiplication factor is adjusted to compensate for a change in the supply signal. The multiplication factor may be increased to compensate for a decrease in the supply signal.

18 Claims, 6 Drawing Sheets

METHOD AND APPARATUS FOR A DC-DC CHARGE PUMP VOLTAGE CONVERTER-REGULATOR CIRCUIT

FIELD OF THE INVENTION

The present invention relates generally to converter circuits. More particularly, the present invention relates to a DC-DC charge pump voltage converter-regulator circuit.

BACKGROUND OF THE INVENTION

Many DC powered devices have subsystems that require a supply voltage higher than power supply can provide. For example, certain display devices that use liquid crystal technology require a relatively high voltage to operate. In these devices, the supply voltage is boosted in order to reach the required operating voltage. Various circuits may be used to do a DC-DC boost conversion of the supply voltage.

One method to obtain a regulated supply voltage for subsystems is to use switched capacitors voltage multipliers followed by a linear voltage regulator. The switched capacitors voltage multipliers multiply the supply voltage by a specified multiplication factor. For example, a supply voltage of 5 volts may be multiplied by a multiplication factor of 2 to achieve an output voltage of 10 volts. The linear regulator can then regulate the output voltage at any voltage level 10 volts or less.

SUMMARY OF THE INVENTION

The present invention is directed to converter circuits. More particularly, the present invention relates to a DC-DC charge pump voltage converter-regulator. The converter-regulator of the present invention includes improved efficiency by providing other forms of regulation for the output voltage. In one embodiment, the converter-regulator includes charge level control implemented by a flip-flop circuit. In a second embodiment, the control of the output voltage is implemented by a logic circuit. In a third embodiment, the control of the output voltage is implemented by an oscillator circuit. In a fourth embodiment, the control of the output voltage is implemented by multiplying the supply voltage according to a multiplication factor dependent upon the level of the supply voltage.

Briefly stated, an apparatus and method for a DC-DC charge pump voltage converter-regulator circuit includes a control circuit, a multiplier circuit, and a feedback circuit. The feedback circuit includes a load circuit, a comparator circuit, and a voltage reference circuit. The multiplier circuit produces an output signal by multiplying a supply signal according to a multiplication factor. The output signal is communicated to the load circuit. The output signal is measured producing a sense signal. The voltage reference circuit produces a reference voltage. The control circuit regulates the output signal according the result of a comparison between the sense signal and the reference voltage. In one embodiment, the multiplication factor is adjusted to compensate for a change in the supply signal. The multiplication factor may be increased to compensate for a decrease in the supply signal.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Figure 1:
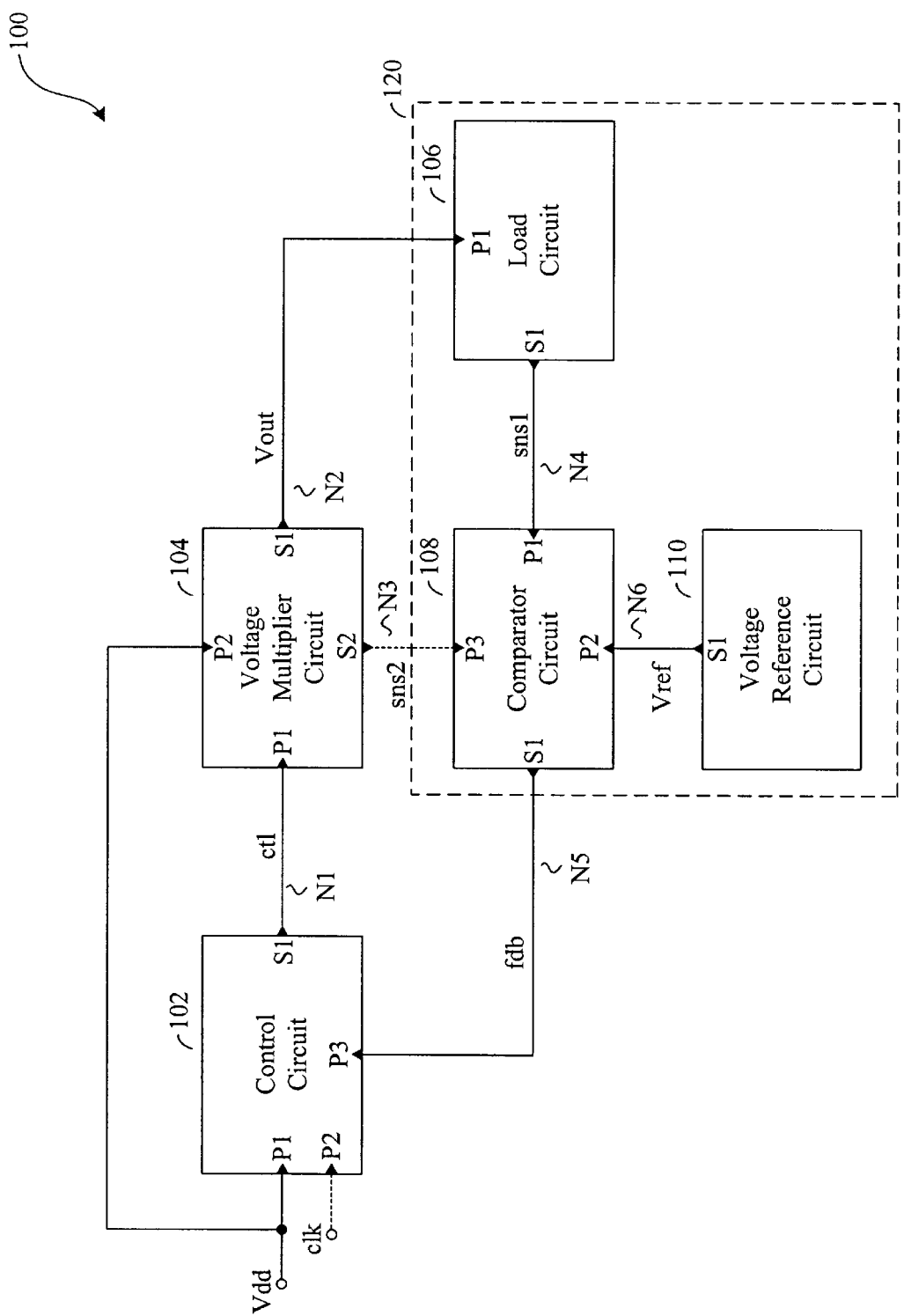
FIG. 1 is a schematic diagram illustrating an exemplary converter-regulator circuit.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on".

The present invention generally relates to a voltage converter-regulator for boosting and regulating an supply voltage. The regulated output voltage of the voltage converter-regulator may then be used with subsystems that require high supply voltages. The voltage converter-regulator has improved efficiency when used in conjunction with a battery cell. The voltage converter-regulator minimizes the use of additional circuitry for controlling a high voltage condition when the battery cell is fully charged.

For example, a typical supply voltage from a battery cell is in a range of 2 . . . 4.2V. The range depends on whether the battery cell is fully charged. If a subsystem requires a supply voltage 12V, then the supply voltage is boosted to supply the 12V. In previous configurations, ×6 voltage multiplier may be used to produce at least a 12V supply voltage for the range of supply voltages. The ×6 multiplier delivers 12 . . . 25.2V depending on the charge level of the battery cell. A linear regulator may then used to limit the output voltage to 12V for the full range of supply voltages. However, this results in 15.2V drop in the voltage when the battery cell is fully charged. Effectiveness of the configuration in this example is therefore (12/25.2)100=47.6%. In addition, the circuitry involved in boosting and regulating the signal is required to handle high voltages of approximately 25.2V.

In the present invention, the supply voltage (Vdd) is boosted to an output voltage (Vout) that has a voltage level corresponding to a reference voltage (Vref). The supply voltage (Vdd) is boosted until it is clamped to a target voltage level, minimizing the circuitry needed for high voltage conditions. The output voltage (Vout) is then regulated at the target voltage, where the target voltage represents the desired supply voltage of a given subsystem.

FIG. 1 is a schematic diagram illustrating an exemplary voltage converter-regulator circuit in accordance with the present invention. The voltage converter-regulator circuit (100) includes a control circuit (102), a voltage multiplier circuit (104), and a feedback circuit (120). The feedback circuit (120) includes a load circuit (106), a comparator circuit (108), and a voltage reference circuit (110).

The control circuit (102) produces a control signal (ctl) at node N1 in response to an supply voltage (Vdd), a clock signal (clk), and a feedback signal (fdb). The voltage multiplier circuit (104) produces the output voltage (Vout) at node N2 and an optional sense signal (sns2) at node N3 in response to the supply voltage (Vdd) and the control signal (ctl). The load circuit (106) produces an output sense signal (sns1) in response to the output voltage (Vout). The voltage reference circuit (110) produces a voltage reference signal (Vref) at node N6. The comparator circuit (108) produces the feedback signal at node N5 in response to the reference signal (Vref) and the either an output sense signal (sns1) or the optional sense signal (sns2).

In operation, the voltage converter-regulator circuit (100) produces an output voltage (Vout) that corresponds to the reference voltage (Vref). The output voltage (Vout) may correspond to the reference voltage (Vref) through a multiplication factor "n", or another relationship. Also, the output voltage (Vout) may be calculated from either the output sense signal (sns1) or the optional sense signal (sns2). The output sense signal (sns1) or the optional sense signal (sns2) indicates that the level of the output voltage (Vout). A comparison of the output sense signal (sns1) or the optional sense signal (sns2) to the voltage reference signal (Vref) also indicates the level of the output voltage (Vout) in comparison to its target voltage. (i.e., Vref=sns1, or Vref=sns2, then Vout=target voltage) Therefore, the feedback signal (fdb) indicates whether the output voltage (Vout) is substantially equal to its target voltage.

The voltage multiplier circuit (104) boosts the output voltage (Vout) to reach its target voltage depending on the potential of the feedback signal (fdb). When the feedback signal (fdb) indicates that the output voltage (Vout) is below its target voltage, the control circuit (102) actuates the voltage multiplier circuit (104). When actuated, the voltage multiplier circuit (104) begins to increase the output voltage (Vout) at the next pulse of the clock signal (clk) until it reaches its target voltage. The occurrence of the output voltage (Vout) reaching its target voltage is reflected in the potential of the feedback signal (fdb). When the output voltage (Vout) reaches its target voltage, the control circuit (102) interrupts the voltage multiplier circuit (104) from continuing to increase the output voltage (Vout) at the next clock pulse. Therefore, the output voltage (Vout) is clamped to a target voltage and avoids a high voltage condition.

Figure 2:
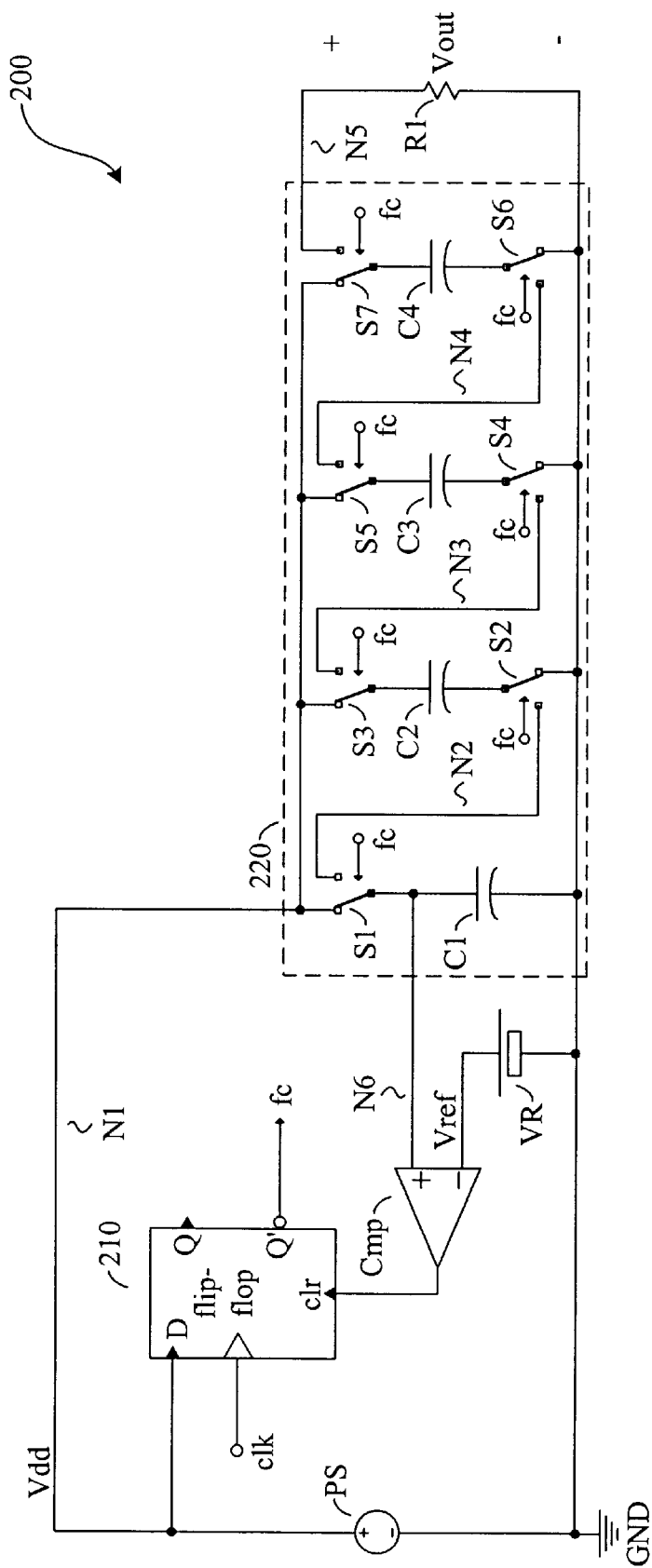
FIG. 2 is a schematic diagram illustrating another embodiment for the exemplary voltage converter-regulator circuit.

FIG. 2 is a schematic diagram illustrating another embodiment for the exemplary voltage converter-regulator circuit in accordance with the present invention. The voltage converter-regulator circuit (200) includes a flip-flop circuit (210), a comparator circuit (Cmp), a load circuit represented by a resistor (R1), a multiplier circuit (220), and a voltage reference circuit (VR). The multiplier circuit (220) includes seven switch circuits (S1-S7) and four capacitance circuits (C1-C4). A power supply circuit (PS) represented by a voltage source, is also included in FIG. 2.

The voltage converter-regulator circuit (200) operates similarly to the voltage converter-regulator circuit (100) shown in FIG. 1. The power supply circuit (PS) produces a supply voltage (Vdd) at node N1. In the present embodiment, the seven switch circuits (S1-S7) control the connection of the four capacitance circuits (C1-C4) in response to a control signal (fc). Switch circuits S1, S3, S5, S7 change the connection of each capacitance circuit (C1-C4) between being coupled to node N1 and another node (N2-N5) respectively. Switch circuits S2, S4, S6 also change the connection of capacitance circuits C2-C4 between being coupled to a ground terminal (GND) and another node (N2-N4) respectively. The switch circuits (S1-S7) are in one of two possible positions: position 1 during a first interval and position 2 during a second interval.

When the switch circuits (S1-S7) are in position 1, the capacitance circuits (C1-C4) are coupled in parallel between node N1 and the ground terminal (GND). Each capacitance circuit (C1-C4) charges exponentially at a rate dependent upon the size of the capacitance circuits (C1-C4) and the type of power supply circuit (PS) used. A non-inverting input of the comparator circuit (Cmp) is coupled to node N6. The comparator circuit (Cmp) also includes an inverting input that is coupled to the voltage reference circuit (VR) and an output coupled to a clear input of the flip-flop circuit (210). The comparator circuit (Cmp) compares the voltage level at node N6 with a reference voltage (Vref) produced by the voltage reference circuit (VR). The comparator circuit (Cmp) produces a clear signal when the charge on the capacitance circuits (C1-C4) reaches a voltage level corresponding to the reference voltage (Vref). The flip-flop circuit (210) receives the clear signal at a clear input. The flip-flop circuit (210) includes the clear input, a D input, a clock input, and two outputs (Q, Q'). The D input is coupled to node N1. The flip-flop circuit (210) produces the control signal (fc) with a high logic level (logic "1") at the Q' output in response to the clear signal at the next rising clock edge of the clock signal (clk). The switch circuits (S1-S7) switch from position 1 to position 2 in response to the control signal (fc).

When the switch circuits (S1-S7) are in position 2, the capacitance circuits (C1-C4) are coupled in series between the ground terminal (GND) and node N5. When series-connected, the capacitance circuits (C1-C4) produce a boosted output voltage (Vout) across the resistor (R1). The output voltage (Vout) rises according a slope to reach an asymptotic voltage level that is approximately equal four-times the supply voltage (Vdd). However, in the present embodiment, the output voltage (Vout) is clamped to a voltage level that is approximately equal to four-times the reference voltage (Vref). The output voltage (Vout) in the present embodiment is dependent upon the load. Therefore, output voltage (Vout) is equal to four-times the reference voltage when the output current is approximately zero. In another embodiment, a greater or fewer number of capacitance circuits may be used. At the next clock edge of the clock signal (clk), the flip-flop circuit (210) changes states, flipping the control signal (fc) from a high logic level (logic "1") to a low logic level (logic "0"). When the control signal is at low logic level, the capacitance circuits (C1-C4) are connected in parallel and are charged by the power supply circuit (PS). The switching process repeats such that the output voltage (Vout) is substantially clamped to a predetermined voltage level based upon a multiple of the reference voltage.

Figure 3:
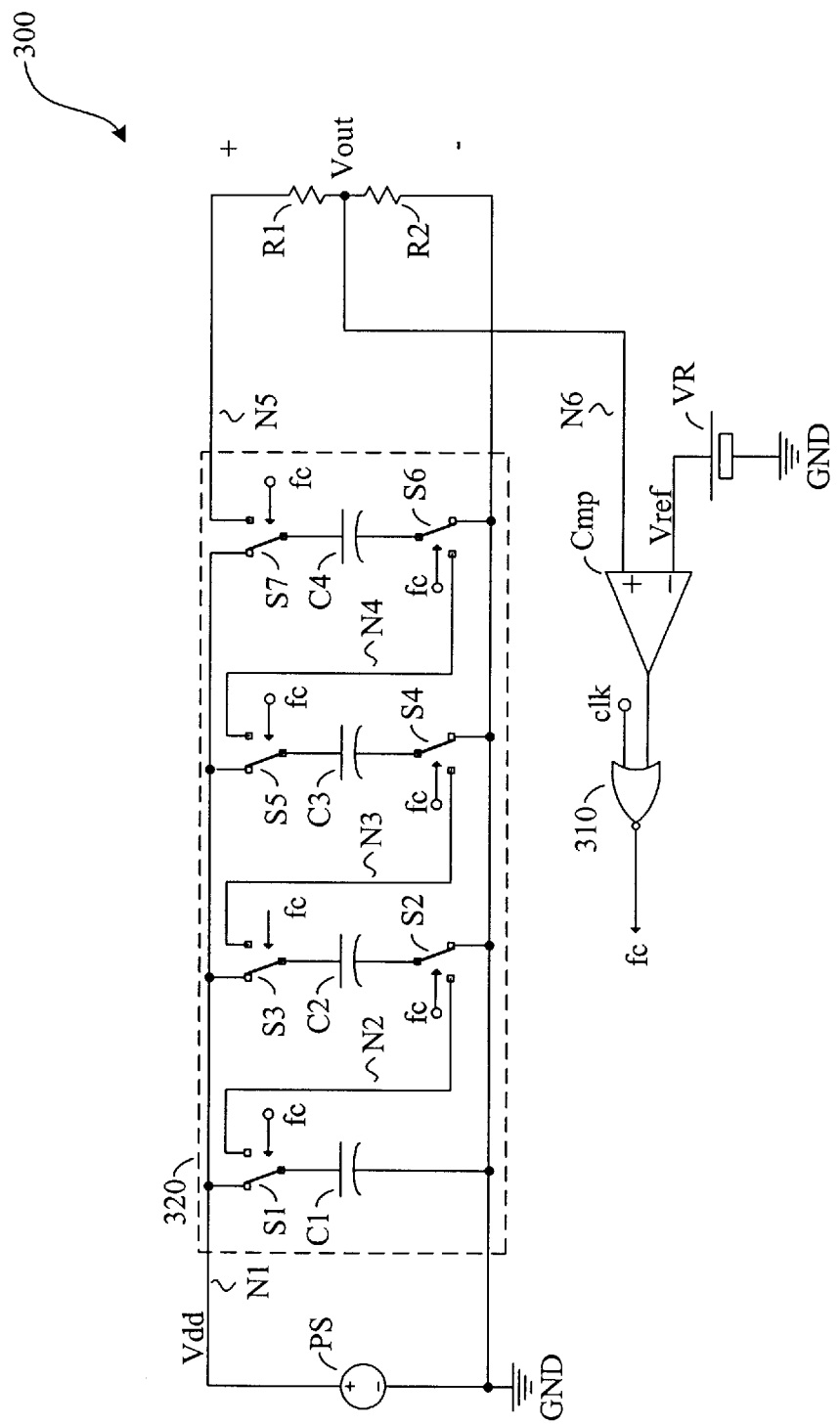
FIG. 3 is a schematic diagram illustrating yet another embodiment for the exemplary voltage converter-regulator circuit.

FIG. 3 is a schematic diagram illustrating another embodiment for the exemplary voltage converter-regulator circuit in accordance with the present invention. The voltage converter-regulator circuit (300) includes a logic circuit (310), a comparator circuit (Cmp), a load circuit represented by two resistors (R1, R2), seven a multiplier circuit (320), and a voltage reference circuit (VR). The multiplier circuit (320) includes seven switch circuits (S1–S7) and four capacitance circuits (C1–C4). A power supply circuit (PS) represented by a voltage source, is also included in FIG. 3.

The voltage converter-regulator circuit (300) operates similarly to the voltage converter-regulator circuit (100) shown in FIG. 1. The power supply circuit (PS) produces a supply voltage at node N1. In the present embodiment, the seven switch circuits (S1–S7) control the connection of the four capacitance circuits (C1–C4) in response to a control signal (fc). Switch circuits S1, S3, S5, S7 change the connection of each capacitance circuit (C1–C4) between being coupled to node N1 and another node (N2–N5) respectively. Switch circuits S2, S4, S6 also change the connection of capacitance circuits C2–C4 between being coupled to a ground terminal (GND) and another node (N2–N4) respectively. The switch circuits (S1–S7) are in one of two possible positions: position 1 and position 2.

When the switch circuits (S1–S7) are in position 1, the capacitance circuits (C1–C4) are coupled in parallel between node N1 and the ground terminal (GND). Each capacitance circuit (C1–C4) charges exponentially at a rate dependent upon the size of the capacitance circuits (C1–C4) and the type of power supply circuit (PS) used. A non-inverting input of the comparator circuit (Cmp) is coupled to node N6. The comparator circuit (Cmp) also includes an inverting input that is coupled to the voltage reference circuit (VR) and an output coupled to a first input of the logic circuit (310). The comparator circuit (Cmp) compares the voltage level at node N6 with a reference voltage (Vref) produced by the voltage reference circuit (VR). The comparator circuit (Cmp) produces feedback signal when output voltage reaches a predetermined voltage level corresponding to the reference voltage (Vref). The logic circuit (310) receives the feedback signal at the first input. The logic circuit (310) includes the first input, a second input, and an output. The second input receives a clock signal (clk) from a clock signal generator (not shown). The logic circuit (310) produces the control signal (fc) with a high logic level (logic "1") at the Q' output in response to the clear signal at the next rising clock edge of the clock signal (clk). The switch circuits (S1–S7) switch from position 1 to position 2 in response to the control signal (fc).

When the switch circuits (S1–S7) are in position 2, the capacitance circuits (C1–C4) are coupled in series between the ground terminal (GND) and node N5. When series-connected, the capacitance circuits (C1–C4) produce a boosted output voltage (Vout) across the load circuit (RL). The output voltage (Vout) rises according a slope to reach an asymptotic voltage level that is approximately equal four-times the supply voltage (Vdd). However, in the present embodiment, the output voltage (Vout) is clamped to a voltage level that corresponds to the reference voltage (Vref). In this embodiment, the output voltage (Vout) of the voltage converter-regulator circuit (300) equals to Vref·(R1+R2)/R2. In another embodiment, another configuration may be used such that the output voltage (Vout) corresponds to the reference voltage (Vref) according to another relationship. When the output voltage (Vout) decreases below the predetermined voltage level, the logic circuit (310) flips the control signal (fc) from a high logic level (logic "1") to a low logic level (logic "0"). When the control signal is at low logic level, the capacitance circuits (C1–C4) are connected in parallel and are charged by the power supply circuit (PS). The switching process repeats such that the output voltage (Vout) is substantially clamped to a predetermined voltage level based upon a multiple of the reference voltage. In this embodiment, the voltage converter-regulator circuit (300) controls the clock pulse width. The clock pulse width is dependent on the output voltage (Vout), wherein the output voltage operates as a control signal.

The advantage of the voltage converter-regulator circuit (300) is that it provides a stable output voltage (Vout) for certain range of output load current. In another embodiment, a switched capacitor voltage divider may be used instead of resistors R1 and R2 along with a clocked synchronous comparator to provide additional effectiveness. In yet another embodiment, control may be implemented by skipping clock pulses instead of pulse width modulation for better noise tolerance.

In this embodiment the logic circuit (310) is illustrated as a NOR gate. In another embodiment, a different logic circuit or combination of logic circuits may be used without departing from the purpose of the present invention.

Figure 4:
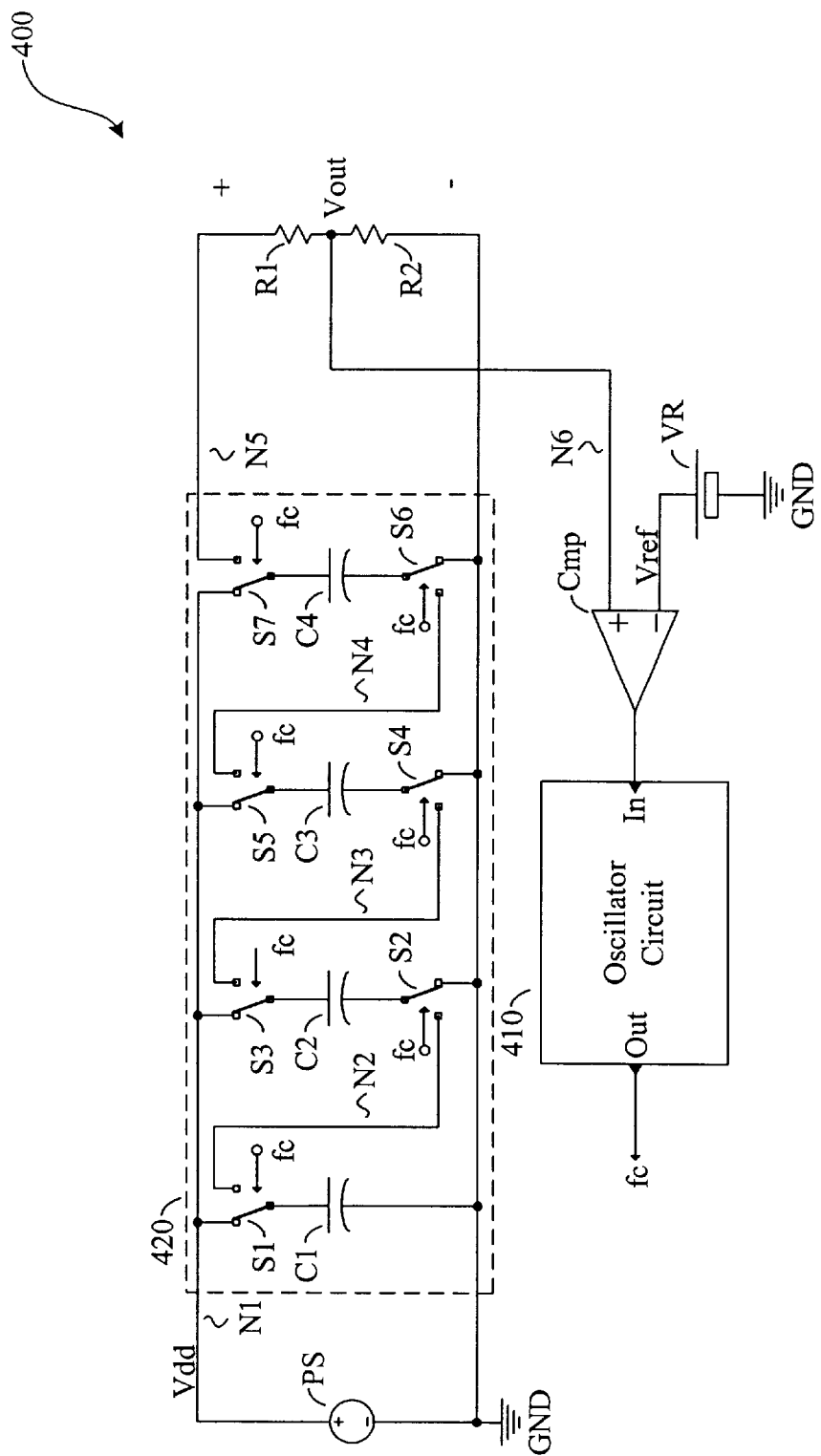
FIG. 4 is a schematic diagram illustrating yet another embodiment for the exemplary voltage converter-regulator circuit.

FIG. 4 is a schematic diagram illustrating another embodiment for the exemplary voltage converter-regulator circuit in accordance with the present invention. The voltage converter-regulator circuit (400) includes an oscillator circuit (410), a comparator circuit (Cmp), a load circuit represented by two resistors (R1, R2), a multiplier circuit (420), and a voltage reference circuit (VR). The multiplier circuit (420) includes seven switch circuits (S1–S7) and four capacitance circuits (C1–C4). A power supply circuit (PS) represented by a voltage source, is also included in FIG. 4.

The voltage converter-regulator circuit (400) operates similarly to the voltage converter-regulator circuit (300) shown in FIG. 3. The voltage converter-regulator circuit (400) includes a controlled oscillator circuit (410) in place of the logic circuit (310) shown in FIG. 3. The voltage converter-regulator circuit (400) has a high efficiency and fast dynamic response to load current changes. The fast dynamic response results in a low output voltage ripple. Clock pulses used in other embodiments that require a clock signal are skipped when load current is low and the output voltage (Vout) decreases slowly in the present embodiment. The skipped pulses result in a low switching frequency and low circuit power consumption. The lower frequency and power consumption result in a high efficiency. The oscillator circuit (410) frequency may be selected at a maximum frequency according to the capacitors used and the switch resistance associated with each switch circuit (S1–S7) for better dynamic performance of the voltage converter-regulator circuit (400). In addition, the oscillator circuit (410) operates to track the frequency of power supply circuit (PS) and the ambient temperature, extending the operation of the voltage converter-regulator circuit (400).

Figure 5:
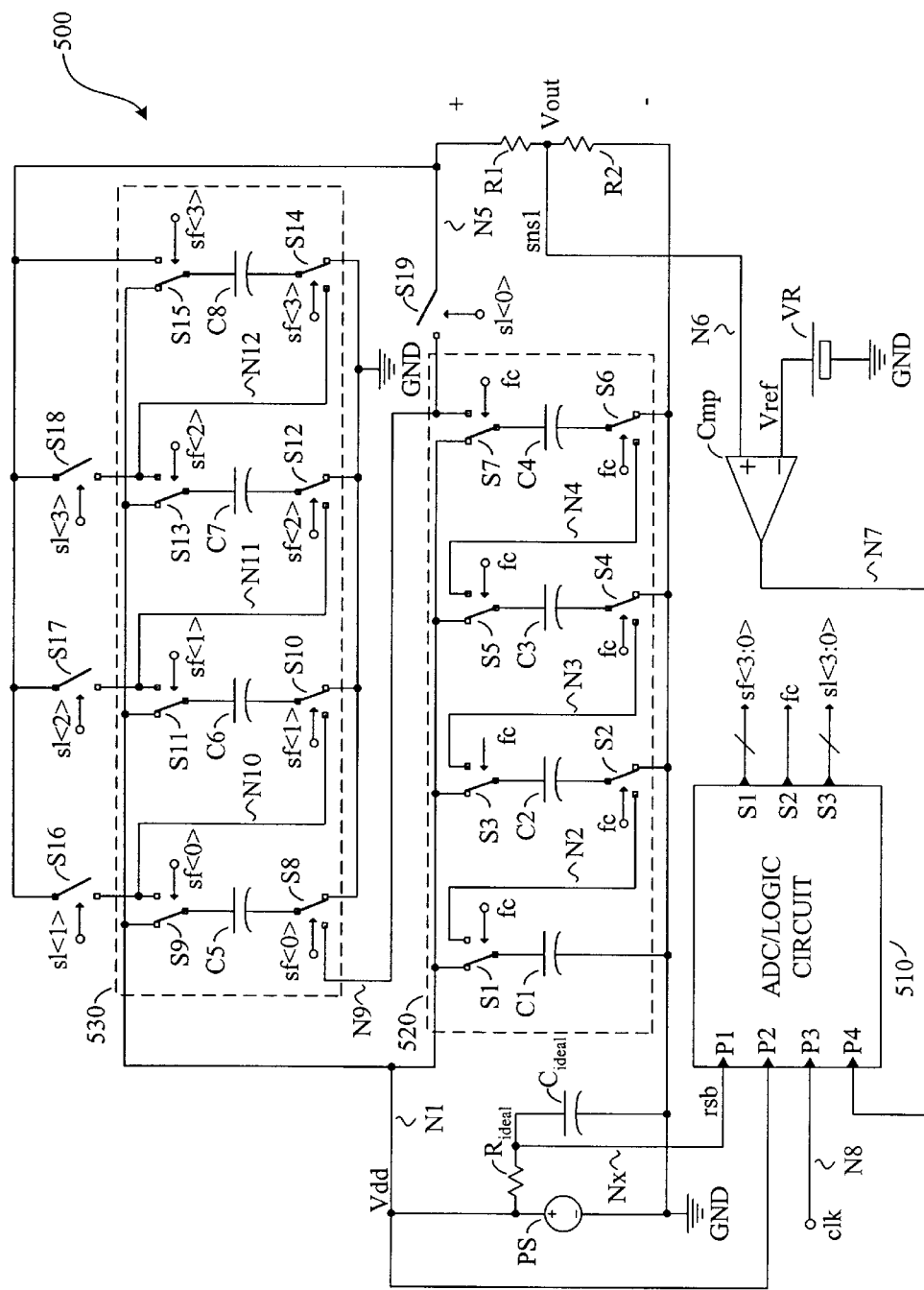
FIG. 5 is a schematic diagram illustrating yet another embodiment for the exemplary voltage converter-regulator circuit.

FIG. 5 is a schematic diagram illustrating another embodiment for the exemplary voltage converter-regulator circuit in accordance with the present invention. The voltage converter-regulator circuit (500) includes an ADC/logic circuit (510), a comparator circuit (Cmp), a load circuit represented by two resistors (R1, R2), two multiplier circuits (520, 530), four switch circuits (S16–S19), a voltage reference circuit (VR), a resistance circuit ($R_{ideal}$), and capacitance circuit ($C_{ideal}$). The multiplier circuits (520, 530) include fifteen switch circuits (S1–S15) and eight capacitance circuits (C1–C8).

The power supply circuit (PS) is coupled between a power supply node (N1) and a ground terminal (GND). The resistance circuit ($R_{ideal}$) is coupled between the power supply node (N1) and node Nx. The capacitance circuit ($C_{ideal}$) is coupled between node Nx and a ground terminal (GND). In multiplier circuit 520, capacitance circuits C1–C4 of are coupled between the ground terminal (GND) and the power supply node (N1) when switch circuits S1–S7 are in a first position, hereinafter referred to as position 1. Capacitance circuits C1–C4 are coupled between the ground terminal (GND), node N2, node N3, node N4, and node N9 respectively (i.e., capacitance circuit C2 is coupled between node N2 and node N3) when switch circuits S1–S7 are in a second position, hereinafter referred to as position 2.

In multiplier circuit 530, capacitance circuits C5–C8 of are coupled between the ground terminal (GND) and the power supply node (N1) when switch circuits S8–S15 are in position 1. Capacitance circuits C5–C8 are coupled between node N9, node N10, node N11, node N12, and node N5 respectively (i.e., capacitance circuit C7 is coupled between node N11 and node N12) when switch circuits S1–S7 are in position 2.

Switch circuits S16–S18 are coupled between node N5 and nodes N1 N12 respectively. Switch circuit S19 is coupled between the power supply node (N1) and node N5. Resistor R1 is coupled between node N5 and node N6. Resistor R2 is coupled between node N6 and the ground terminal (GND). The comparator circuit (Cmp) includes a non-inverting input coupled to node N6, an inverting input coupled to the voltage reference circuit (VR), and an output coupled to node N7. The ADC/logic circuit (510) includes a first input (P1) coupled to node Nx, a second input (P2) that is coupled to the power supply node (N1), a third input (P3) that is coupled to node N8, and a fourth input (P4) that is coupled to node N7. The ADC/logic circuit (510) includes three outputs (S1–S4) that control the positions of the switch circuits (S1–S19). The ADC/logic circuit (510) is described in greater detail in FIG. 6.

The voltage converter-regulator circuit (500) operates similarly to the voltage converter-regulator circuit (300) shown in FIG. 3. However, voltage converter-regulator circuit (500) includes a second multiplier circuit 530. The power supply circuit (PS) produces a supply voltage (Vdd) at node N1. Switch circuits S1–S15 switch between a first position, position 1, and a second position, position 2. Switch circuits S16–S19 are either open or closed. Switch circuits S1–S7 are actuated in response to a first control signal (fc). Switch circuits S8–S15 are actuated in response to control signals sf<3:0>. Switch circuits S8 and S9 are actuated in response to control signal sf<0>. Switch circuits S10 and S11 are actuated in response to control signal sf<1>. Switch circuits S12 and S13 are actuated in response to control signal sf<2>. Switch circuits S14 and S15 are actuated in response to control signal sf<3>. Switch circuits S16–S19 are actuated in response to control signals sl<3:0>. Switch circuit 16 is actuated in response to control signal sl<1>. Switch circuit 17 is actuated in response to control signal sl<2>. Switch circuit 18 is actuated in response to control signal sl<3>. Switch circuit 19 is actuated in response to control signal sl<0>.

The control signals (fc, sl<3:0>, sf<3:0>) are produced by the ADC/logic circuit (510) in response to a reset signal (rsb) that is provided at node Nx, a supply signal (Vdd) that is provided at node N1, a clock signal (clk) produced at node N8, and a feedback signal (fdb) that is provided at node N7. The supply voltage (Vdd) is produced by the power supply circuit (PS). The clock signal (clk) is produced by a clock signal generator (not shown). The feedback signal (fdb) is produced by the comparator circuit (Cmp) in response to a comparison of a sense signal (sns1) to a reference signal (Vref). The sense signal (sns1) is a voltage level that corresponds to a measurement of the output voltage (Vout) of the voltage converter-regulator circuit (500). The reference signal (Vref) is produced by the voltage reference circuit (VR).

When switch circuits S1–S15 are in position 1, the capacitance circuits (C1–C8) are coupled in parallel between the power supply node (N1) and the ground terminal (GND). Switch circuits S1–S15 remain in position 1 until the capacitance circuits (C1–C8) charge to a predetermined voltage level. Once the capacitance circuits (C1–C8) are charged to the predetermined voltage level, a select number of the switch circuits (S1–S19) may be actuated to produce a predetermined output voltage (Vout) across the load circuit (R1, R2).

In one embodiment, the power supply circuit (PS) is a battery cell that produces different supply voltage (Vdd) levels depending upon the level of charge present in the battery cell. For instance, the supply voltage (Vdd) may be at a low voltage level when the battery cell is substantially discharged and a high voltage level when the battery cell is substantially charged. For example, the supply voltage (Vdd) may range from 2V to 4V, or over some other range of voltages associated with battery cells. The present embodiment compensates for the degradation of the supply voltage (Vdd) by multiplying the supply voltages by a range of multiplication factors (n). For supply voltages in the range from 2V to 4V, the following exemplary table (table 1) illustrates the affect of changing the multiplication factor on the output voltage (Vout).

TABLE 1

| Vdd | <2.3 V | 2.3–2.6 V | 2.6–3.2 V | 3.2–4 V | >4 V |
| --- | --- | --- | --- | --- | --- |
| n | 8 | 7 | 6 | 5 | 4 |
| Vout | <18.4 V | 16–18.2 V | 15.6–19.2 V | 16–20 V | >16 V |

From exemplary Table 1, it can be observed that the output voltage (Vout) does not reach a voltage level beyond 20V. The present invention operates to avoid a high voltage condition by limiting the output voltage (Vout) to lower voltages.

The multiplication factor (n) changes in response to a change in the supply voltage (Vdd) to maintain a predetermined voltage level for the output voltage (Vout). The multiplication factor (n) is dependent on the number and size of the capacitance circuits (C1–C8) that are coupled together in series when the capacitance circuits are discharged to the load circuit (R1, R2).

The first multiplier circuit (520) of the voltage converter-regulator (500) multiplies the supply voltage (Vdd) by a multiplication factor of 4 when capacitance circuits C1–C4 are coupled together in series. Each additional capacitance circuit (C5–C8) that is coupled in series with capacitance circuits C1–C4 of the second multiplier circuit (530) increases the multiplication factor (n) by 1. The switch circuits (S1–S19) are selectively actuated to either include or exclude the capacitance circuits (C5–C8) of the second multiplier circuit (530).

In a first example, the voltage converter-regulator circuit (500) is configured to multiply the supply voltage (Vdd) by a multiplication factor of 4. For this example, switch circuits S16–S18 are open, switch circuit S19 is closed, and switch circuits S1–S7 are switched from position 1 to position 2 in response to the clock signal (clk) (i.e., at the next rising edge). Switch circuits S8–S15 are maintained in position 1. When switch circuits are switched from position 1 to position 2, the sum of the voltage levels for capacitance circuits C1–C4 may be observed across the resistors R1 and R2. With equal-sized and sufficiently large capacitance circuits C1–C4, the output voltage (Vout) across resistors R1 and R2 is proportional to four times the supply voltage (Vdd).

In a second example, the voltage converter-regulator circuit (500) is configured to multiply the supply voltage (Vdd) by a multiplication factor of 5. For this example, switch circuit S16 is closed, switch circuits S17–S19 are open, and switch circuits S1–S9 are switched from position 1 to position 2 in response to the clock signal (clk). Switch circuits S10-S15 are maintained in position 1. When switch circuits S1–S9 are switched from position 1 to position 2, the sum of the voltage levels for capacitance circuits C1–C5 may be observed across the resistors R1 and R2.

In a third example, the voltage converter-regulator circuit (500) is configured to multiply the supply voltage (Vdd) by a multiplication factor of 6. For this example, switch circuit S17 is closed, switch circuits S16, S18, and S19 are open, and switch circuits S1–S11 are switched from position 1 to position 2 in response to the clock signal (clk). Switch circuits S12–S15 are maintained in position 1. When switch circuits S1–S1 are switched from position 1 to position 2, the sum of the voltage levels for capacitance circuits C1–C6 may be observed across the resistors R1 and R2.

In a fourth example, the voltage converter-regulator circuit (500) is configured to multiply the supply voltage (Vdd) by a multiplication factor of 7. For this example, switch circuit S18 is closed, switch circuits S16, S17, and S19 are open, and switch circuits S1–S13 are switched from position 1 to position 2 in response to the clock signal (clk). Switch circuits S14 and S15 are maintained in position 1. When switch circuits S1–S13 are switched from position 1 to position 2, the sum of the voltage levels for capacitance circuits C1–C7 may be observed across the resistors R1 and R2.

In a fifth example, the voltage converter-regulator circuit (500) is configured to multiply the supply voltage (Vdd) by a multiplication factor of 8. For this example, switch circuits S16–S19 are open, and switch circuits S1–S15 are switched from position 1 to position 2 in response to the clock signal (clk). When switch circuits S1–S15 are switched from position 1 to position 2, the sum of the voltage levels for capacitance circuits C1–C4 may be observed across the resistors R1 and R2.

In other embodiments, an increased or decreased number of multiplier circuits or capacitance circuits may be used to increase or decrease the multiplication factor (n) available to the voltage converter-regulator circuit (500).

Figure 6:
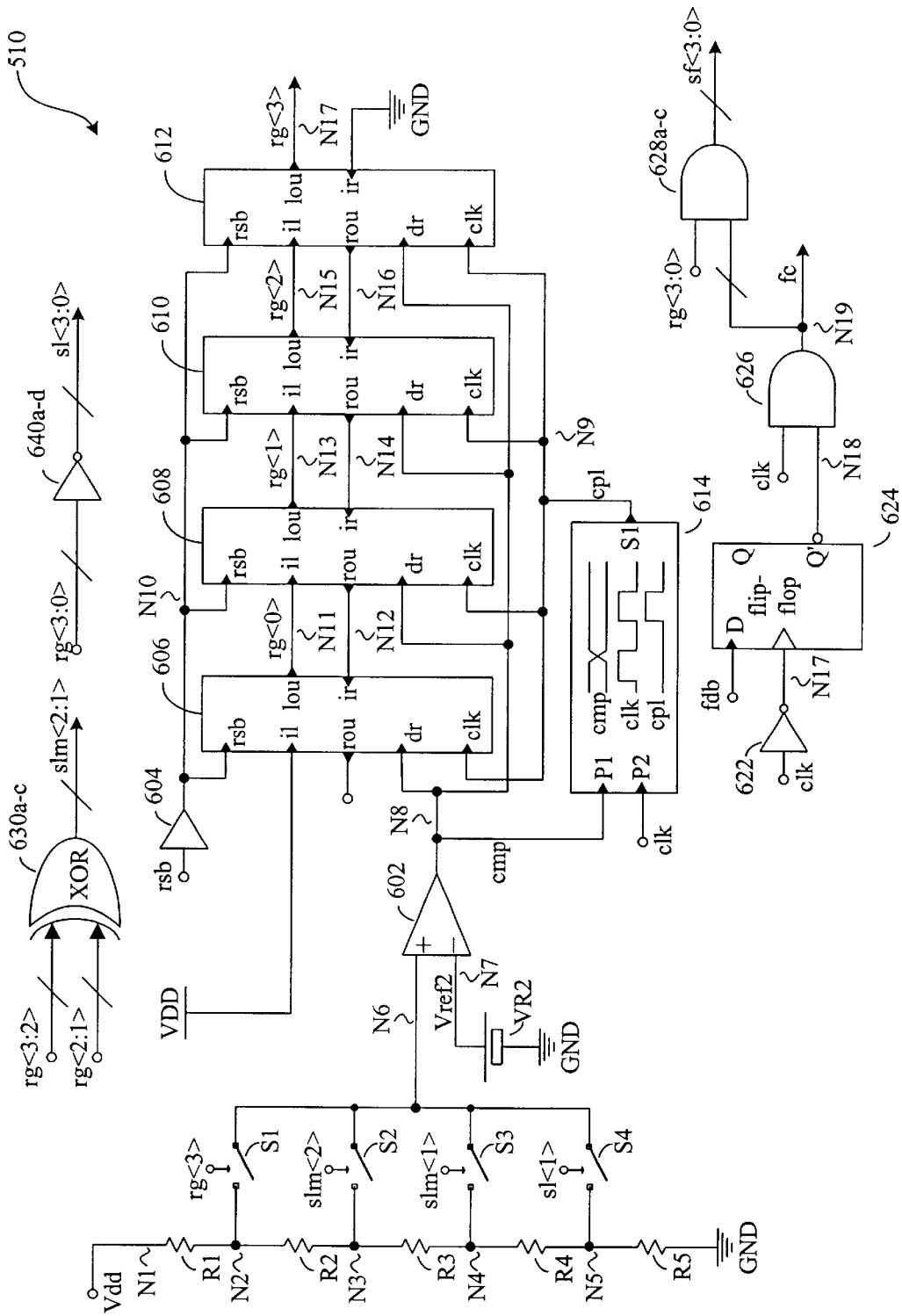
FIG. 6 is a schematic diagram illustrating an exemplary logic circuit for the voltage converter-regulator circuit shown in FIG. 5, in accordance with the present invention.

FIG. 6 is a schematic diagram illustrating an exemplary logic circuit for the voltage converter-regulator circuit shown in FIG. 5. The logic circuit (510) includes five resistance circuits (R1–R5), four switch circuits (S1–S4), A comparator circuit (602), a voltage reference circuit (VR2), a buffer circuit (604), five flip-flop circuits (606, 608, 610, 612, 624), a clock generation circuit (614), five inverter circuits (622, 640a–d), four AND logic circuits (626, 628a–c), and three XOR logic circuits (630a–c).

The resistance circuits (R1–R5) are coupled in a resistance ladder separated by nodes (N1–N5), or voltage tap points. Resistance circuit R1 is coupled between node N1 and node N2. Resistance circuit R2 is coupled between node N2 and node N3. Resistance circuit R3 is coupled between node N3 and node N4. Resistance circuit R4 is coupled between node N4 and node N5. Resistance circuit R5 is coupled between node N5 and a ground terminal (GND).

The switch circuits (S1–S4) are coupled between node N6 nodes N2–N5 respectively. The comparator circuit (602) includes a non-inverting input that is coupled to node N6, an inverting input that is coupled to node N7, and an output that is coupled to node N8. The voltage reference circuit (VR2) is coupled between node N7 and the ground terminal (GND). The clock generation circuit (614) includes a first input (P1) that is coupled to node N8, a second input (P2) that is coupled to the clock signal (clk) that is illustrated in FIG. 5, and an output (S1) that is coupled to node N9. The buffer circuit (604) is coupled between node N10 and the reset signal (rsb) that is illustrated in FIG. 5.

In this embodiment, flip-flop circuits 606, 608, 610, and 612 are bi-directional flip-flops circuits. Flip-flop circuit 606 includes a first input (rsb) that is coupled to node N10, a second input (il) that is coupled to the power supply node (VDD), a third input (ir) that is coupled to node N12, a fourth input (dr) that is coupled to node N8, a fifth input (clk) that is coupled to node N9, a first output (lou) that is coupled to node N11, and a second output (rou). Flip-flop circuit 608 includes a first input (rsb) that is coupled to node N10, a second input (il) that is coupled to node N11, a third input (ir) that is coupled to node N14, a fourth input (dr) that is coupled to node N8, a fifth input (clk) that is coupled to node N9, a first output (lou) that is coupled to node N13, and a second output (rou) that is coupled to node N12. Flip-flop circuit 610 includes a first input (rsb) that is coupled to node N10, a second input (il) that is coupled to node N13, a third input (ir) that is coupled to node N16, a fourth input (dr) that is coupled to node N8, a fifth input (clk) that is coupled to node N9, a first output (lou) that is coupled to node N15, and a second output (rou) that is coupled to node N14. Flip-flop circuit 612 includes a first input (rsb) that is coupled to node N10, a second input (il) that is coupled to node N15, a third input (ir) that is coupled to the ground terminal (GND), a fourth input (dr) that is coupled to node N8, a fifth input (clk) that is coupled to node N9, a first output (lou) that is coupled to node N17, and a second output (rou) that is coupled to node N16.

Inverter circuit 622 is coupled between node N17 and the clock signal (clk) that is illustrated in FIG. 5. Flip-flop circuit 624 includes a first input (D) that is coupled to the feedback signal (fdb) that is illustrated in FIG. 5, a second input that is coupled to node N17, a first output (Q), and a second output (Q') that is coupled to node N18. AND logic circuit 626 includes a first input that is coupled to the clock signal (clk) that is illustrated in FIG. 5, a second input that is coupled to node N18, and an output that is coupled to node N19. AND logic circuits 628a–c each include a first input that is coupled to a corresponding one of signals rg<3:0> respectively, a second input that is couple to node N19, and an output that corresponds to signals sf<3:0> that are illustrated in FIG. 5.

XOR logic circuits 630a–c each include a first input that is coupled to signals rg<3:2> respectively, a second input that is coupled to a corresponding one of signals rg<2: 1> respectively, and an output that corresponds to one of signals slm<2: 1>. Inverter circuits 640a–d each include an input that is coupled to a corresponding one of signals rg<3:0> and an output that corresponds to one of signals sl<3:0> that are illustrated in FIG. 5.

In operation, the resistance circuits (R1–R5) form a voltage divider with multiple tap points. Each voltage tap point corresponds to a particular potential related to the supply voltage (Vdd). A potential is provided at node N6 when one or more of the switch circuits (S1–S4) are closed. Switch circuits S1–S4 are actuated in response to signals rg<3>, slm<2>, slm <1>, and sl<1> respectively. The comparator circuit (602) produces a comparison signal (cmp) in response to the comparison of the potential at node N6 to the reference voltage (Vref2). Vref2 is produced by the reference voltage circuit (VR2). The clock generation circuit (614) is arranged to produce a clock pulse signal (cpl) in response to the comparison signal (cmp) and the clock signal (clk) that is illustrated in FIG. 5.

Flip-flop circuits 606, 608, 610, and 612 are arranged to operate as a shift register. Signal rsb operates as a reset signal for the shift register during power-up. The reset signal (rsb) ensures that the shift register remains in a reset state until a voltage determined by capacitance circuit $C_{ideal}$ is reached. As the clock pulse signal (cpl) is applied to each flip-flop circuit (606, 608, 610, 612), a low logic level (logic "0") is shifted to the left or to the right in the shift register. The left input port (il) of the first flip-flop circuit (606) is coupled to the supply signal (VDD) such that a logic "0" is shifted from the right to the left when the clock pulse signal (cpl) is applied to the shift register. The right input port (ir) of the last flip-flop circuit (612) is coupled to the ground terminal (GND) such that the logic "0" may be shifted back from the left to the right when the clock pulse signal (cpl) is applied to the shift register. The comparison signal (cmp) is applied to an input port (dr) of each flip-flop circuit (606, 608, 610, 612). The shifting direction (right or left) of the shift register is determined by the comparison signal.

The source voltage (Vdd) may decrease over time due to voltage drain. A voltage drain may occur when the power source is a battery cell or some other voltage storing device. For example, the source voltage (Vdd) may reach a potential (e.g., 3.9V) that indicates the source voltage (Vdd) is decreasing below its original potential (e.g., 4V). In the present embodiment, switch circuit S4 is closed when the source voltage (Vdd) has decreased slightly below its original potential. When the source voltage (Vdd) further decreases (e.g., to 3.2V), the potential at node N6 decreases. The comparator circuit (602) detects when the potential at node N6 decreases below reference voltage Vref2. The comparison signal (cmp) transitions to a low logic level when the potential at node N6 decreases to a potential less than reference voltage Vref2.

The shift register pushes a low logic level to the right in response to the low logic level of the comparison signal (cmp) in response to the clock pulse signal (cpl) (i.e., at the next rising edge). As previously stated, switch S4 is closed, therefore control signal sl<1> is a high logic level. Control signal rg<1> is the inverse of control signal sl<1> and is therefore a low logic level. Correspondingly, the potential at node N13 is a low logic level. Control signal rg<2> transitions to a low logic level in response to a right directional push of the low logic level at node N13 in the shift register. As stated previously, inverter circuits 640a–d inverting control signals rg<3:0> to produce control signals sl<3:0>. Control signal sl<2> is a high logic level and control signals sl<0>, sl<1>, and sl<2> are low logic levels in response to inverting signals rg<3:0>. Switch circuit S17 closes in response to sl<2> and switch circuits S16, S18, and S19 are open. In the present embodiment, a multiplication factor of 6 results when switch circuit S17 is closed. The multiplication factor compensates for the decrease in the source voltage as described above.

Further, XOR logic circuits 630a–c produce control signals slm<2:1> in response to control signals rg<3:2> and control signals rg<2:1> respectively. Signal slm<1> actuates switch circuit S3, while signal slm<2> actuates switch circuit S2. In the example provided, rg<0>, rg<1>, and rg<3> are low logic levels and rg<2> is a high logic level, resulting in slm<1> being a high logic level. Accordingly, switch circuit S3 is actuated, changing the potential at node N6 to correspond to the reference voltage (Vref2) given the change in the supply voltage (Vdd). Switch circuits S1–S4 may be actuated to regulate the potential at node N6 as the supply voltage (Vdd) decreases. The multiplier may be adjusted as the supply voltage (Vdd) changes when the potential at node N6 changes in response to the next decrease in the supply voltage.

Flip-flop circuit 624 produces an output (Q') in response to the feedback signal (fdb) and the inverse of the clock signal (clk). The clock signal (clk) is inverted by inverter 622. When the feedback signal (fdb) is at a high logic level, the Q' output is a low logic level. The Q' output is a high logic level when the feedback signal (fdb) is at a low logic level. The feedback signal (fdb) corresponds to the output voltage of the voltage converter-regulator circuit (500) shown in FIG. 5. For example, the feedback signal (fdb) is a low logic level (logic "0") when the sense signal (sns1) is less than reference voltage Vref shown in FIG. 5. The Q' output of flip-flop circuit 624 is set to a high logic level at the next rising edge of the inverse of the clock signal (clk) in response to the low logic level of the feedback signal (fdb). Control signal fc is produced by AND logic circuit 626 in response to the Q' output and the clock signal (clk). The control signal (fc) actuates switch circuits S1–S7 shown in FIG. 5 as described above. Control signals sf<3:0> are produced by AND logic circuits 628a–c in response to signals rg<3:0> respectively and control signal fc. Control signals sf<3:0> actuate switches S8–S14 that are illustrated in FIG. 5 as described above.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for providing an output signal from a supply signal that has an associated voltage level, the apparatus comprising:

a control circuit that is configured to produce a control signal in response to the supply signal and a feedback signal that is associated with the output signal;

a first multiplier circuit receiving the control signal to produce the output signal by multiplying the supply signal according to a first multiplication factor, wherein the first multiplication factor is adjusted to compensate for a change in the supply signal;

a second multiplier circuit that is selectively coupled to the first multiplier circuit such that the first and second multiplier circuits produce the output signal in response to multiplying the supply signal by a second multiplication factor when the second multiplier circuit is coupled to the first multiplier circuit, wherein the second multiplication factor is greater than the first multiplication factor when the supply signal decreases below a predetermined level;

the feedback circuit that is configured to provide a feedback signal in response to receiving the output signal, wherein the control circuit provides regulation of the output signal in response to the feedback signal.

2. An apparatus as in claim 1, wherein the control circuit further comprises a logic circuit that is configured to produce the control signal in response to the supply signal and the feedback signal.

3. An apparatus as in claim 2, wherein the logic circuit further comprises a flip-flop circuit.

4. An apparatus as in claim 1, wherein the control circuit further comprises an oscillator circuit that is configured to produce a clock signal in response to the feedback signal, wherein the control signal is responsive to the clock signal.

5. An apparatus as in claim 1, wherein the control circuit further comprises an ADC/logic circuit that is configured to produce at least the control signal in response to the supply signal and the feedback signal.

6. An apparatus as in claim 1, wherein the first and second multiplier circuits further comprising a multiplicity of capacitance circuits, wherein the multiplicity of capacitance circuits are coupled to the supply signal during a first interval, and a selected group of the multiplicity of capacitance circuits are coupled in series with one another during a second interval such that the second multiplication factor is related to the selected group of the multiplicity of capacitance circuits.

7. An apparatus as in claim 1, the first multiplier circuit further comprising a multiplicity of capacitance circuits that are coupled to the supply signal during a first interval, and a selected group of the multiplicity of capacitance circuits that are coupled in series with one another during a second interval such that a second multiplication factor is related to the selected group of the multiplicity of capacitance circuits.

8. An apparatus as in claim 1, the feedback circuit further comprising:
   a load circuit that is arranged to produce a sense signal in response to the output signal;
   a voltage reference circuit that is arranged to produce a reference voltage; and
   a comparator circuit that is configured to produce the feedback signal in response to a comparison between the reference voltage and the sense signal.

9. An apparatus as in claim 1, wherein the output signal is regulated to a predetermined level that is related to a reference signal by comparing at least a portion of the output signal to the reference signal.

10. A method for providing an output signal in response to a supply signal comprising:
    multiplying the supply signal according to a multiplication factor to produce the output signal, wherein the multiplication factor is adjusted according to a predetermined number of capacitance circuits that are selectively coupled in series to produce the output signal, and wherein the multiplication factor corresponds to first and second multiplication factors;
    measuring a sense signal that has a potential that is related to the output voltage;
    comparing the sense signal to a reference signal;
    regulating the output signal using a control circuit, wherein the output signal is regulated in response to the comparison of the sense signal to the reference signal; and
    adjusting the first and second multiplication factors to compensate for a change in the supply signal such that the second multiplication factor is greater than the first multiplication factor when the supply signal decreases below a predetermined level.

11. A method as in claim 10, further comprising adjusting the multiplication factor according to the potential of the supply signal.

12. A method as in claim 10, wherein multiplying the supply signal further comprises coupling the predetermined number of capacitance circuits to the supply signal during a first interval and coupling the predetermined number of capacitance circuits in series during a second interval.

13. A method as in claim 12, further comprising coupling additional capacitance circuits to the supply signal during the first interval and coupling additional capacitance circuits in series with the predetermined number of capacitance circuits during the second interval to adjust the multiplication factor.

14. A method as in claim 10, further comprising adjusting the multiplication factor in response to the supply signal, wherein the multiplication factor is increased when the supply voltage decreases below a predetermined voltage level.

15. A method as in claim 14, the step of adjusting the multiplication factor further comprising coupling capacitance circuits in parallel to the supply signal such that the capacitance circuits are charged during a first interval, coupling a selected number of the capacitance circuits in series with one another during a second interval such that an output signal is provided by the selected number of capacitance circuits.

16. A method as in claim 15, the step of regulating the output signal further comprising adjusting at least one of the first and second intervals such that the output signal is maintained above a predetermined threshold level.

17. An apparatus for providing an output signal in response to a supply signal, comprising:
    a means for multiplying that is arranged to multiply the supply signal according to a multiplication factor to produce the output signal, wherein the multiplication factor is adjusted according to a predetermined number of capacitance circuits selectively coupled in series to produce the output signal, and wherein the multiplication factor corresponds to first and second multiplication factors;
    a means for measuring that is arranged to measure a sense signal that has a potential related to the output voltage;
    a means for comparing that is arranged to compare the sense signal to a reference signal;
    a means for regulating coupled to the means for multiplying to regulate the output signal using a control circuit, wherein the output signal is regulated in response to the comparison of the sense signal to reference signal; and
    a means for adjusting that is arranged to adjust the first and second multiplication factors to compensate for a change in the supply signal such that the second multiplication factor is greater than the first multiplication factor when the supply signal decreases below a predetermined level.

18. An apparatus for providing an output signal from a supply signal that has an associated voltage level, the apparatus comprising:
    a control circuit comprising an ADC/logic circuit that is configured to produce a control signal in response to the supply signal and a feedback signal that is associated with the output singal;
    a first multiplier circuit receiving the control signal to produce the output signal by multiplying the supply signal according to a first multiplication factor, wherein the first multiplication factor is adjusted to compensate for a change in the supply signal; and
    a feedback circuit that is configured to provide a feedback signal in response to receiving the output signal, wherein the control circuit provides regulation of the output signal in response to the feedback signal.

* * * * *

UNITED STATES PATENT AND TRADEMARK OFFICE
CERTIFICATE OF CORRECTION

PATENT NO.     : 6,717,458 B1
DATED          : April 6, 2004
INVENTOR(S)    : Vladislav Y. Potanin It is certified that error appears in the above-identified patent and that said Letters Patent is hereby corrected as shown below:

Column 12,
Line 63, after "level;" please add -- and --.

Signed and Sealed this

Twenty-first Day of September, 2004

JON W. DUDAS
*Director of the United States Patent and Trademark Office*